United States Patent
Zhang et al.

(10) Patent No.: US 9,612,327 B2
(45) Date of Patent: Apr. 4, 2017

(54) METHODS AND APPARATUS FOR PERSISTENT DEPLOYMENT OF AERIAL VEHICLES

(71) Applicant: IDENTIFIED TECHNOLOGIES CORPORATION, Belle Mead, NJ (US)

(72) Inventors: Richard Yang Zhang, Belle Mead, NJ (US); Andy Wu, Lexington, MA (US)

(73) Assignee: Identified Technologies Corporation, Pittsburgh, PA (US)

(*) Notice: Subject to any disclaimer, the term of this patent is extended or adjusted under 35 U.S.C. 154(b) by 360 days.

(21) Appl. No.: 14/193,110

(22) Filed: Feb. 28, 2014

(65) Prior Publication Data

US 2016/0011592 A1    Jan. 14, 2016

Related U.S. Application Data

(60) Provisional application No. 61/771,054, filed on Feb. 28, 2013.

(51) Int. Cl.

| | |
|---|---|
| *G01S 13/88* | (2006.01) |
| *B64C 39/02* | (2006.01) |
| *B64F 1/02* | (2006.01) |
| *G05D 1/10* | (2006.01) |
| *G08G 5/00* | (2006.01) |
| *B64F 1/28* | (2006.01) |

(Continued)

(52) U.S. Cl.
CPC .......... *G01S 13/885* (2013.01); *B64C 39/024* (2013.01); *B64F 1/02* (2013.01); *G05D 1/10* (2013.01); *A61M 5/20* (2013.01); *B64C 2201/066* (2013.01); *B64C 2201/182* (2013.01); *B64F 1/12* (2013.01); *B64F 1/22* (2013.01); *B64F 1/28* (2013.01); *G05B 19/00* (2013.01); *G05D 1/0011* (2013.01); *G08G 5/00* (2013.01); *G08G 5/0069* (2013.01); *H04B 7/18506* (2013.01)

(58) Field of Classification Search
CPC ...... B64F 1/22; B64F 1/12; B64F 1/28; B64F 1/125; B64D 1/22; B64C 39/024; G08G 5/00; G08G 5/0069; G05D 1/00; G05D 1/0027; G05D 1/028; G05D 1/0011; G06Q 10/08; G06Q 50/28; G06Q 40/04; G06Q 20/32; G06Q 50/02; H04B 7/18506; B64B 1/64; B64B 1/00; B64B 1/10; G05B 19/00; G01S 13/885; A61M 5/20; A01B 79/005
See application file for complete search history.

(56) References Cited

U.S. PATENT DOCUMENTS

| | | |
|---|---|---|
| 3,745,575 A | 7/1973 | Kikuchi |
| 5,068,669 A | 11/1991 | Koert et al. |

(Continued)

*Primary Examiner* — Behrang Badii
(74) *Attorney, Agent, or Firm* — Coats & Bennett, P.L.L.C.

(57) ABSTRACT

Methods and apparatus are disclosed for persistent deployment of aerial vehicles. The present application discloses a mission control system that is configured to control and manage one or more aerial vehicles for deployment to and from one or more docking stations. The one or more docking stations may be configured with a battery swapping device for removing the depleted battery from an aerial vehicle and for refilling a charged battery into the aerial vehicle. The mission control system may be configured to generate a priority list used to determine the recharging order of the one or more aerial vehicles.

6 Claims, 19 Drawing Sheets

(51) Int. Cl.
  *G05B 19/00* (2006.01)
  *A61M 5/20* (2006.01)
  *B64F 1/22* (2006.01)
  *H04B 7/185* (2006.01)
  *B64F 1/12* (2006.01)
  *G05D 1/00* (2006.01)

(56) References Cited

U.S. PATENT DOCUMENTS

| | | | |
|---|---|---|---|
| 6,967,462 | B1 | 11/2005 | Landis |
| 7,443,057 | B2 | 10/2008 | Nunally |
| 7,893,862 | B2 | 2/2011 | Holly et al. |
| 8,072,380 | B2 | 12/2011 | Crouch |
| 8,193,965 | B2 | 6/2012 | O'Donnell et al. |
| 8,511,606 | B1 | 8/2013 | Lutke et al. |
| 8,979,032 | B1 * | 3/2015 | Hester, Jr. ............ B64C 39/024 244/137.4 |
| 2007/0210953 | A1 | 9/2007 | Abraham et al. |
| 2010/0243794 | A1 | 9/2010 | Jermyn |
| 2011/0017865 | A1 | 1/2011 | Achtelik et al. |
| 2012/0092208 | A1 | 4/2012 | LeMire et al. |
| 2012/0298839 | A1 | 11/2012 | King et al. |
| 2013/0081245 | A1 | 4/2013 | Vavrina et al. |
| 2014/0022051 | A1 * | 1/2014 | Levien ................ A61M 5/20 340/5.2 |
| 2014/0032034 | A1 * | 1/2014 | Raptopoulos ........ G08G 5/0069 701/25 |
| 2014/0117147 | A1 | 5/2014 | Hanna et al. |
| 2014/0124621 | A1 * | 5/2014 | Godzdanker .......... B64F 1/125 244/110 E |
| 2014/0129059 | A1 | 5/2014 | Scarlatti et al. |
| 2014/0203140 | A1 | 7/2014 | McGeer et al. |
| 2015/0158513 | A1 * | 6/2015 | Costa ................ H04N 5/23203 348/144 |

* cited by examiner

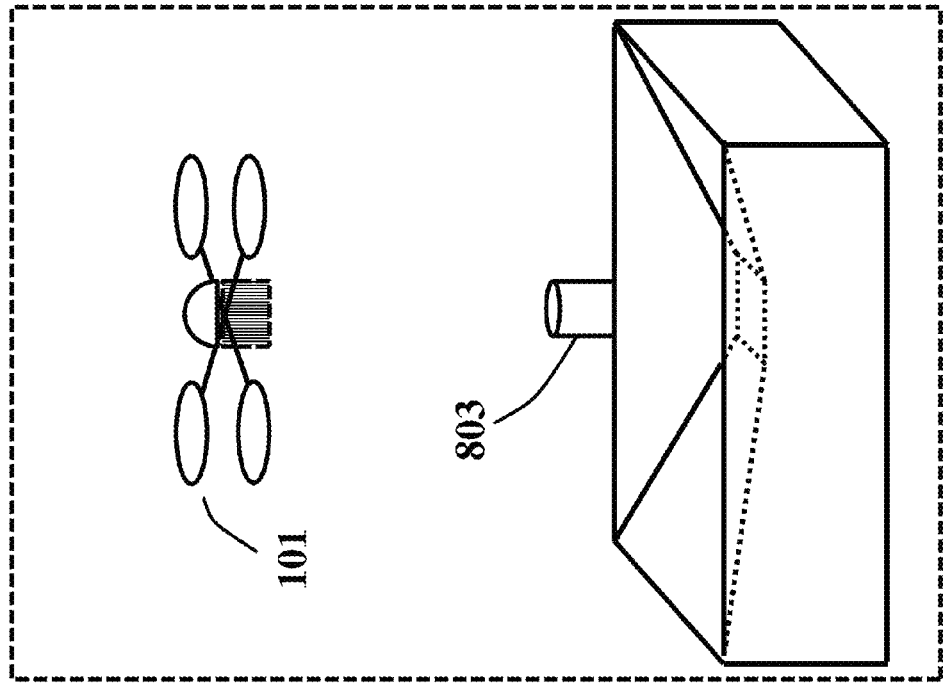
Figure 8b
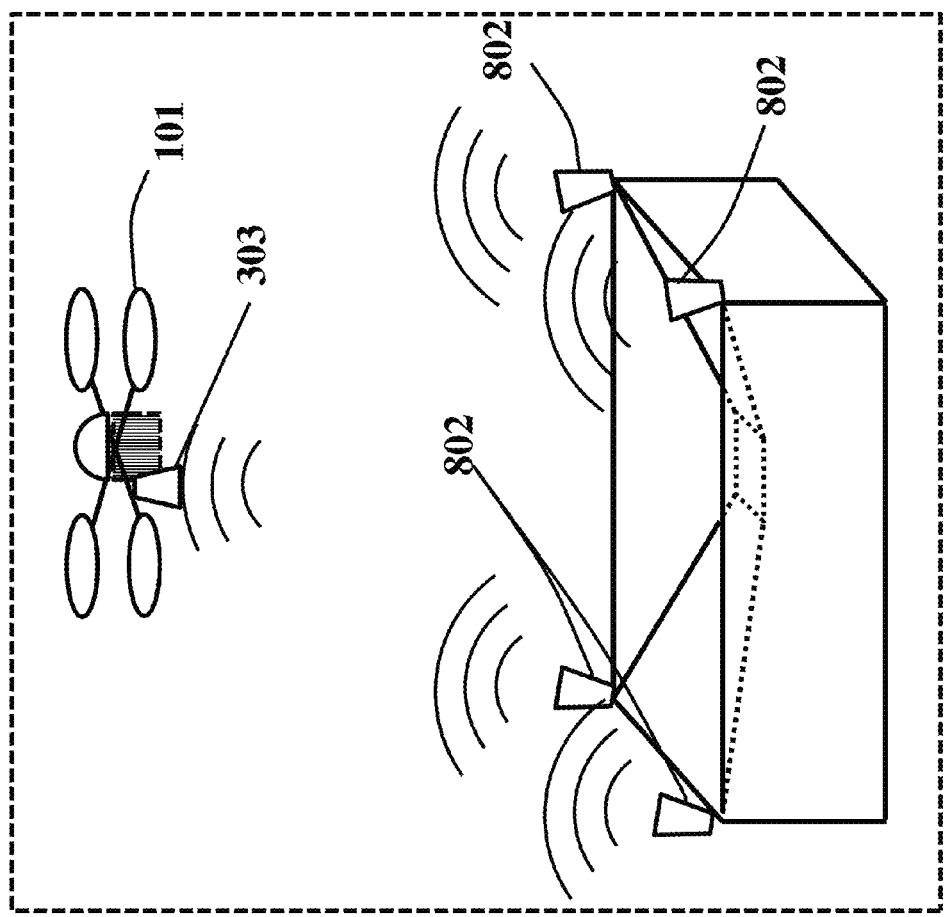
Figure 8a
Figure 8

Figure 16
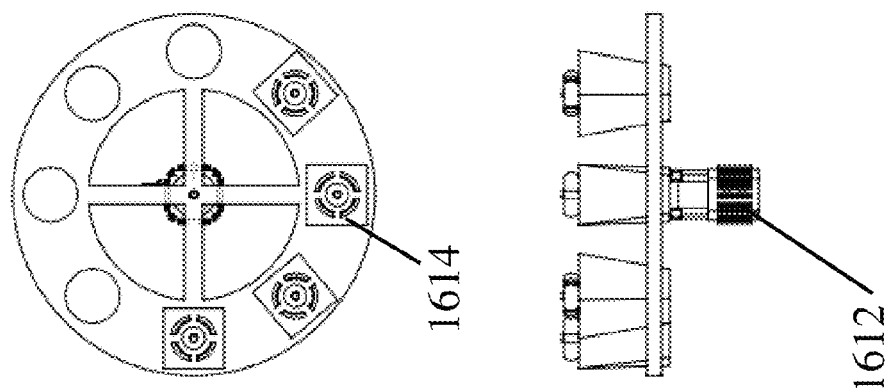
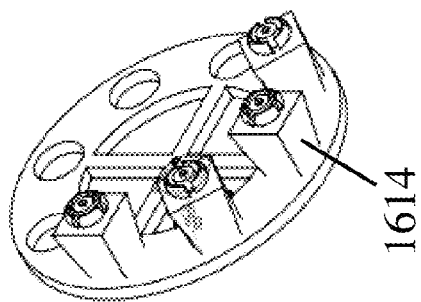
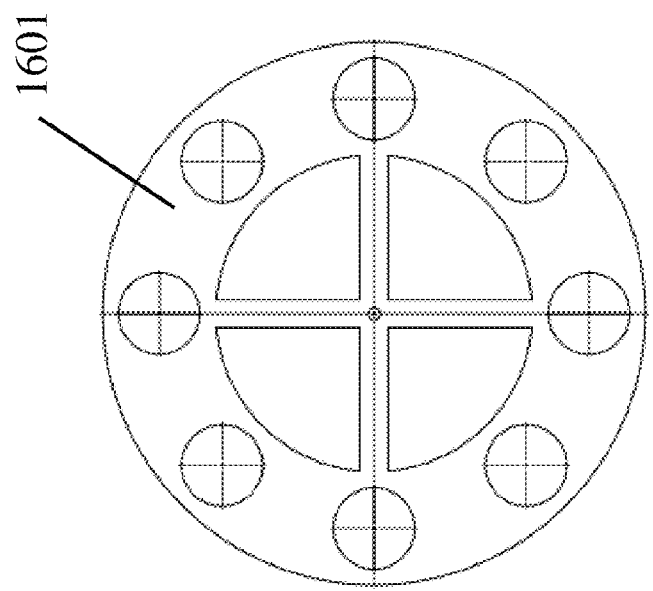

METHODS AND APPARATUS FOR PERSISTENT DEPLOYMENT OF AERIAL VEHICLES

PRIORITY CLAIM

The present application claims priority to U.S. Provisional Application 61/771,054, filed on 28 Feb. 2013.

TECHNICAL FIELD

The present application relates generally to controlling and managing deployment of aerial vehicles.

BACKGROUND

Aerial vehicles are unmanned flying devices whose movements can be remotely controlled. Examples of aerial vehicles include tri-copters, quad-copters, multi-rotor flying crafts. An aerial vehicle is generally equipped with one or more motors. For example, T-Motor™ is excellent motors that are commercially available and can be used to build a multi-rotor craft. The motors drive one or more propellers and may be powered by batteries or combustion engines. Additionally, an aerial vehicle may be configured with a computer chip and may have antennas installed for communicating with a controlling device.

Aerial vehicles can be used for different purposes, for example, aerial photography or merchandise delivery. An aerial vehicle has limited load capacity and can only carry a limited amount of payloads. Consequently, the number of batteries or the amount of combustion fuel an aerial vehicle can carry is limited, which in turn limits the aerial vehicle's flight time. During a mission, an aerial vehicle may be required to stop at a home station for refueling or recharging.

Further during an aerial data collection mission, an aerial vehicle can generate a large amount of data. For example, a digital camera on the aerial vehicle collects image data or video data. The aerial vehicle can transmit the generated data to a controlling device via wireless communication. Alternatively, the aerial vehicle can return to the controlling device for data transfer, which may be faster than if the data is transferred wirelessly.

As more and more aerial vehicles are deployed for commercial and military missions, persistent and accurate mission control becomes important for ensuring the successful completion of a critical mission. The present application discloses methods and apparatus that can be used for persistent deployment of aerial vehicles.

SUMMARY

In some embodiments, a docking station for receiving and docking an aerial vehicle is disclosed. The docking station comprises a transceiver, a docking device, a power supply device and a processing circuit. The transceiver is configured for communicating with the aerial vehicle. The docking device is configured for receiving and docking the aerial vehicle. The power supply device is configured for supplying power to the aerial vehicle when the aerial vehicle is docked at the docking station. The processing circuit is configured to control the aerial vehicle while the aerial vehicle is docked at the docking station. In some embodiments, the docking station may further comprise a position sensor and/or an active docking mechanism. In some embodiments, the power supply device of the docking station is a battery charging mechanism or a battery swapping device.

In some embodiments, a mission control system for controlling deployment of one or more aerial vehicles is disclosed. The mission control system comprises a transceiver, memory, an input/output device, and a mission control processing circuit. The transceiver is configured for communicating with the one or more aerial vehicles and with a docking station. The memory is configured for storing flight data of the one or more aerial vehicles. The I/O device is configured for receiving and outputting data. The mission control processing circuit is configured for controlling the deployment of the one or more aerial vehicles based on the flight data stored in the memory and the input and output data of the I/O device. In some embodiments, when there are multiple aerial vehicles but only one docking station, the mission control system can generate a priority list that indicates an order for each aerial vehicle to return to the docking station.

In some embodiments, an aerial vehicle is disclosed. The aerial vehicle comprises a transceiver, a motor component, a power supply unit, and a processing unit. The transceiver is configured for communicating with a docking station and a mission control system. The motor component is configured for controlling movement of the aerial vehicle and the power supply unit is configured to supply power for the aerial vehicle. The processing circuit is configured to receive commands from the mission control system for deployment of the aerial vehicle and returning of the aerial vehicle to the docking station. Based on the receive commands, the processing circuit is further configured to direct the movement of the aerial vehicle. The aerial vehicle may optionally comprise a position sensor and/or a payload for transportation.

In some embodiments, a system for persistent deployment of one or more aerial vehicles to and from a docking station is disclosed. The system comprises one or more aerial vehicles, one or more docking stations, and a mission control system. The one or more aerial vehicles are configured to perform a mission when deployed and to return to one or more docking stations for docking. The docking station is configured to receive and supply power to one or more aerial vehicles. The mission control system is configured for controlling and managing the one or more aerial vehicles and the one or more docking stations for persistent deployment of the one or more aerial vehicles.

BRIEF DESCRIPTION OF FIGURES

FIGS. 7, 8, 9, and 10 each illustrate a different embodiment of a docking station.

FIG. 14-18 illustrate various arrangements of one or multiple docking stations.

DETAILED DESCRIPTION

Certain specific details are set forth in the following description and drawings to provide a thorough understanding of various embodiments of the invention. Certain well-known details often associated with computing and software technology are not set forth in the following disclosure to avoid unnecessarily obscuring the various embodiments of the invention. Furthermore, those of ordinary skill in the relevant art will understand that other embodiments of the invention can be practiced without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
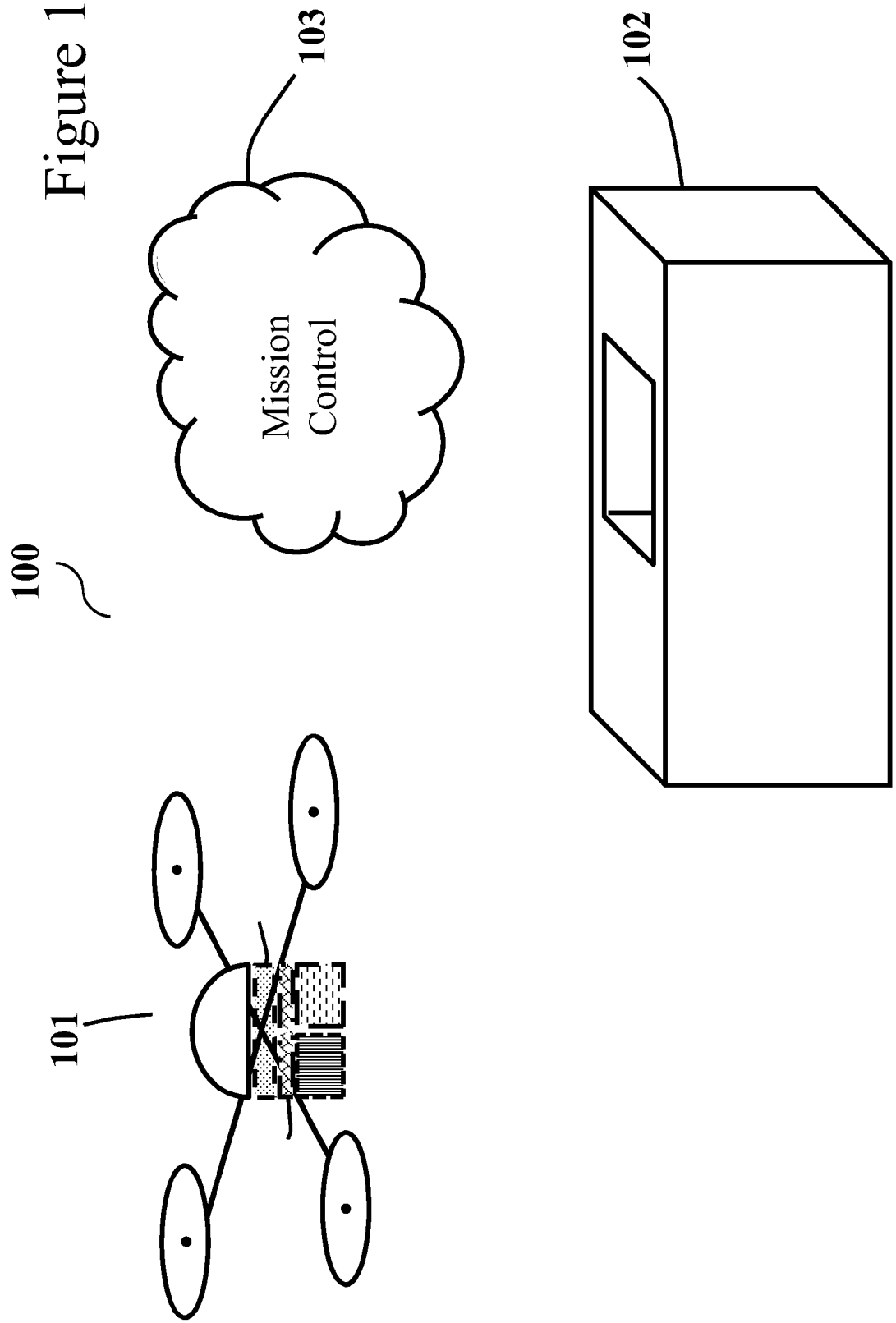
FIG. 1 illustrates an exemplary aerial vehicle deployment system.

FIG. 1 illustrates an exemplary aerial vehicle deployment system 100. The aerial vehicle deployment system 100 comprises three components: an aerial vehicle 101, a docking station 102, and a mission control system 103. The docking station 102 is configured to receive the aerial vehicle 101 and to provide a dock for parking the aerial vehicle. Additionally, the docking station 102 can be configured to provide storage for the aerial vehicle 101. The mission control system 103 is configured to control and manage the deployment of the aerial vehicle 101.

Figure 2:
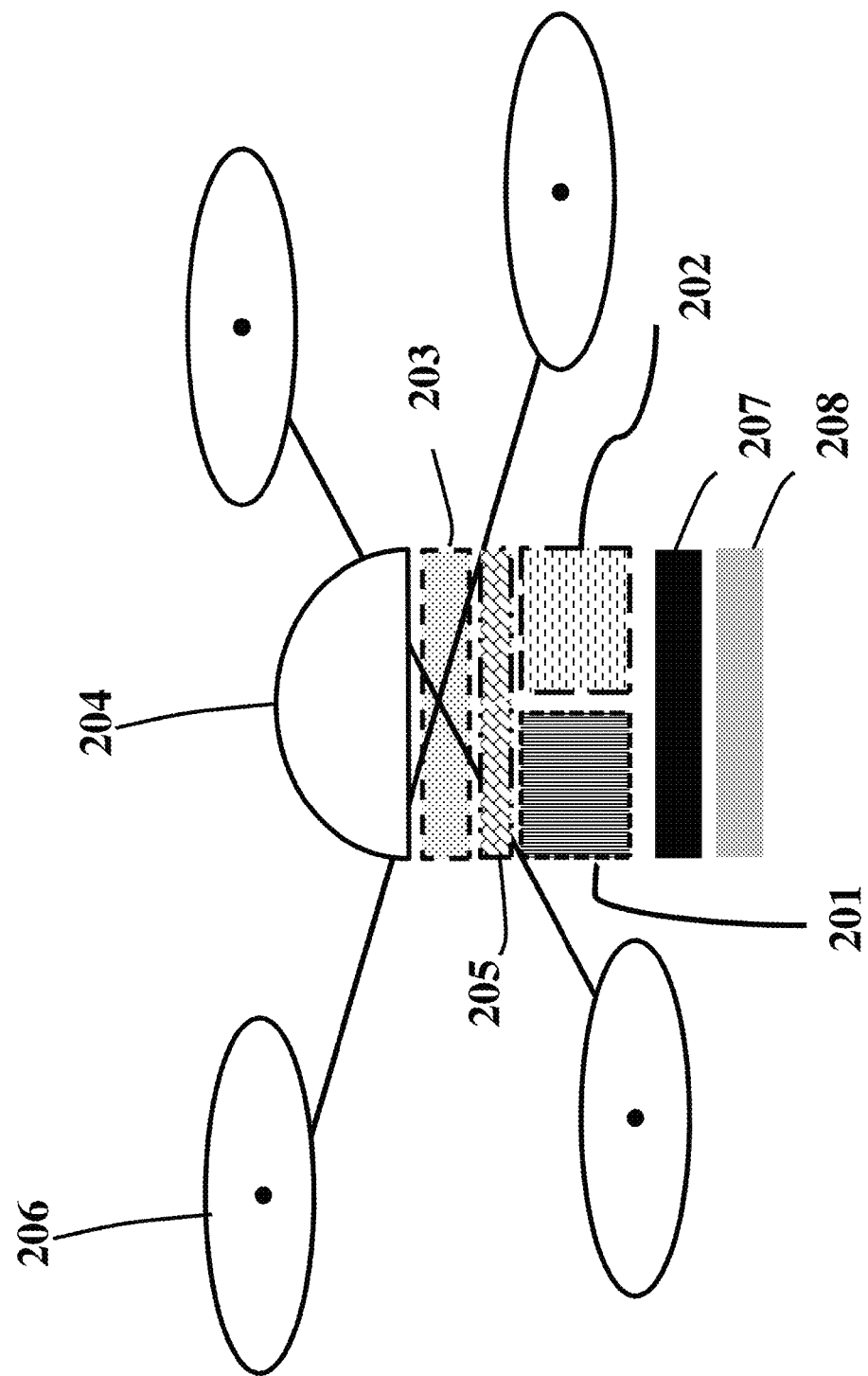
FIG. 2 illustrates an exemplary aerial vehicle.

In FIG. 1 and all other figures, the aerial vehicle 101 is depicted as a quadrotor, a four rotor formulation of a helicopter. However, the aerial vehicle 101 can be any type of unmanned flying device. An exemplary aerial vehicle 101 is shown in FIG. 2. The mission control system 103 comprises a programmable computer with various I/O capabilities. The functions and features of the mission control system 103 will be described in detail later on. In some embodiments, the mission control system 103 may be implemented as a unit or component separate from the aerial vehicle 101 and the docking station 102 as shown in FIG. 1. In other embodiments, the mission control system 103 may be implemented as part of the aerial vehicle 101 or as part of the docking station 102. In yet other embodiments, the mission control system 103 may be implemented partly on the aerial vehicle 101 and partly on the docking station 102.

In FIG. 2, the aerial vehicle 101, shown as a quadrotor, comprises a power supply unit 201, an optional sensor 202, an optional position sensor 203, a vehicle processing circuit 205, a propulsion mechanism 206, a motor control component 207, and a transmitter/receiver (transceiver) 208. The aerial vehicle 101 in FIG. 2 is shown to carry an optional payload 204. In some embodiments, the power supply unit 201 comprises a lithium-polymer battery that is rechargeable when depleted. The sensor 202 provides sensing capabilities for the aerial vehicle. Examples of the sensor 202 include gas detection sensors, ultrasound sensors, infrared sensors, etc. The position sensor 203 collects information regarding the position of the aerial vehicle 101. The position information of the aerial vehicle 101 may be expressed relative to a known object in the immediate surroundings or relative to a known reference point on the Earth. Examples of the position sensor 203 include Global Positioning System (GPS) receivers and Motion Capture System (MCS) receivers. Propulsion mechanism 206 often consists of a motor and a propeller.

In FIG. 2, the vehicle processing circuit 205 receives input from the mission control system 103, the optional sensors 202, and the optional position sensor 203. The vehicle processing circuit 205 sends control signals to the motors 206. When the optional payload 204 comprises computerized components, the vehicle processing circuit 205 also interacts with the payload 204. Examples of the payload 204 include cameras, video cameras, non-visual sensors, collected soil/water/waste specimens, and parcels of merchandise that need to be transported and delivered.

Figure 3:
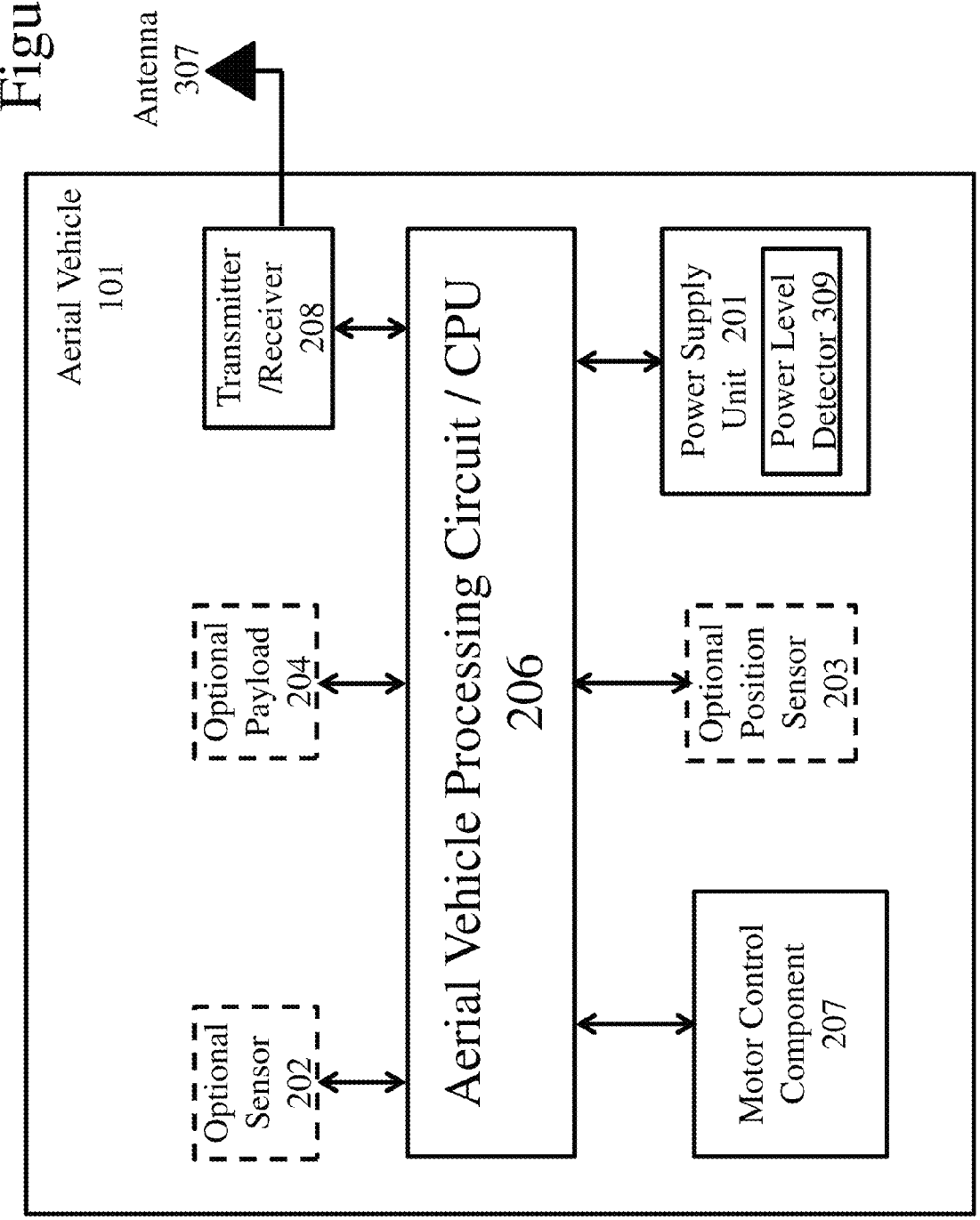
FIG. 3 illustrates a block diagram of an aerial vehicle.

FIG. 3 is an exemplary block diagram depicting the interaction between the different components of the aerial vehicle 101. In FIG. 3, the motor control component 207, the optional position sensor 203, the optional sensor 202, the optional payload 204, the transmitter/receiver 208, and the power supply unit 201 of the aerial vehicle 101 all interface with the vehicle processing circuit 206. The transmitter/receiver 208 is equipped with antennae 307. The antennae 307 are configured to communicate with the mission control system 103.

As shown in FIG. 3, the power supply unit 201 includes a power level detector 309 for monitoring the power level of the power supply unit 201. In some embodiments, when the detected power level is low, the aerial vehicle returns to the docking station 102 for recharging or refueling of the power supply unit 201.

Figure 4:
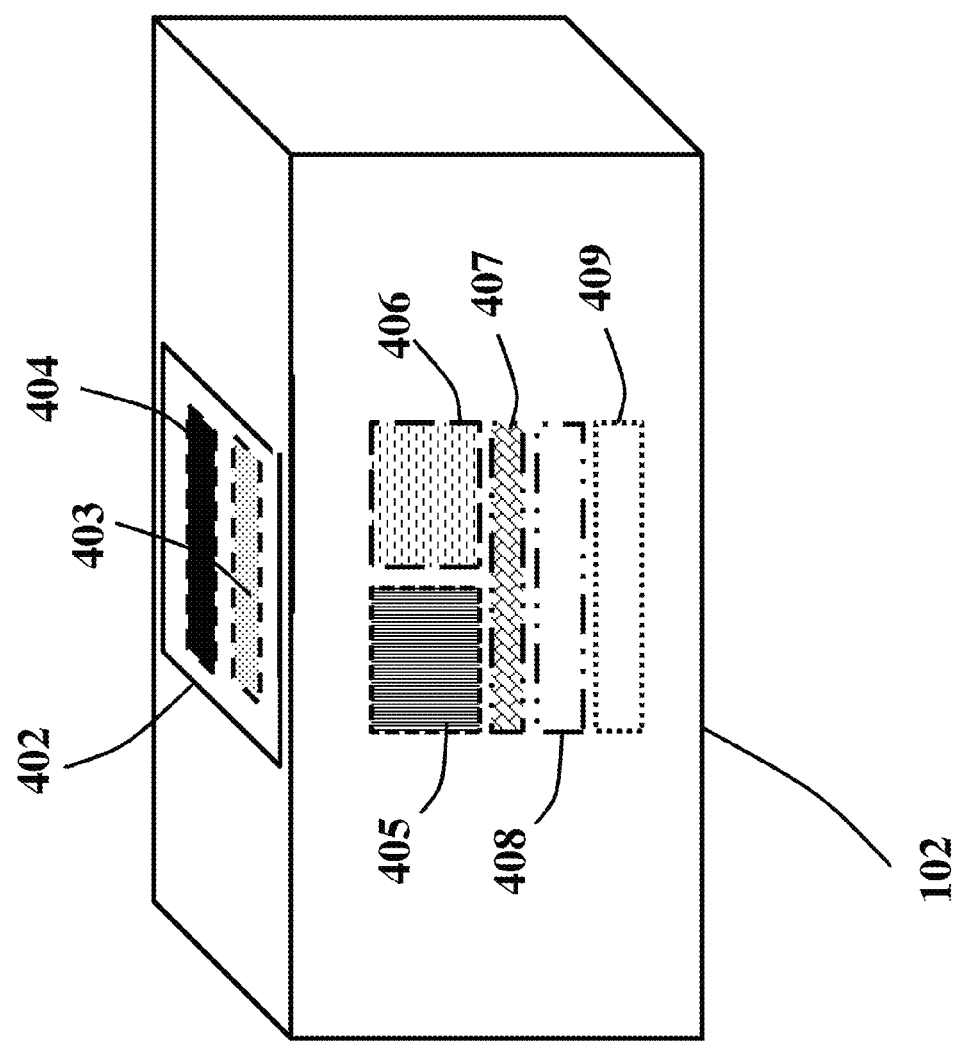
FIG. 4 illustrates an exemplary docking station.

FIG. 4 depicts an exemplary docking station 102. The docking station 102 comprises a landing zone 402, a battery charging mechanism 403, a battery swapping mechanism 404, an active docking mechanism 405, a position sensor 406, a power supply unit 407, a transmitter/receiver 408, and a docking station processing circuit/CPU 409. One or more of the battery charging mechanism 403, the battery swap mechanism 404, the position sensor 406, the power supply unit 407, and the transceiver 408 may be optional. The landing zone 402 is where the aerial vehicle 101 lands on the docking station 102, and contains various components for servicing the aerial vehicle 101. The optional battery charging mechanism 403 recharges the aerial vehicle 101 to replenish its power supply unit 201 while the aerial vehicle 101 is docked on the docking station 102. Alternatively, instead of charging the depleted power supply unit 201 of the aerial vehicle 101, the optional battery swap mechanism 404 is configured to remove the depleted power supply unit 201 from the aerial vehicle 101 and swap in a pre-charged power supply unit 201. It may be a quicker alternative to charging the aerial vehicle 101.

As show in FIG. 4, some of the components of the docking station 102 are depicted as located outside of the landing zone 402. These components of the docking station 102 may be located within the landing zone 402, although not required. For example, the active docking mechanism 405 is shown as located beneath the landing zone 402 but can be located within the landing zone 402. The active docking mechanism 405 is optional and is configured to actively locate the aerial vehicle 101 when it is away from the docking station 102 and bring the aerial vehicle 101 back to the docking station 102. The position sensor 406 is also optional and is designed to assist the aerial vehicle to accurately land in the landing zone 402. The power supply unit 407 supplies power to the docking station 102 in remote locations where there is no other power outlet or power source. The transceiver 408 enables the docking station to communicate with the mission control system 103. The docking station processing circuit 409 is configured to control and manage the various components of the docking station 102.

Figure 5:
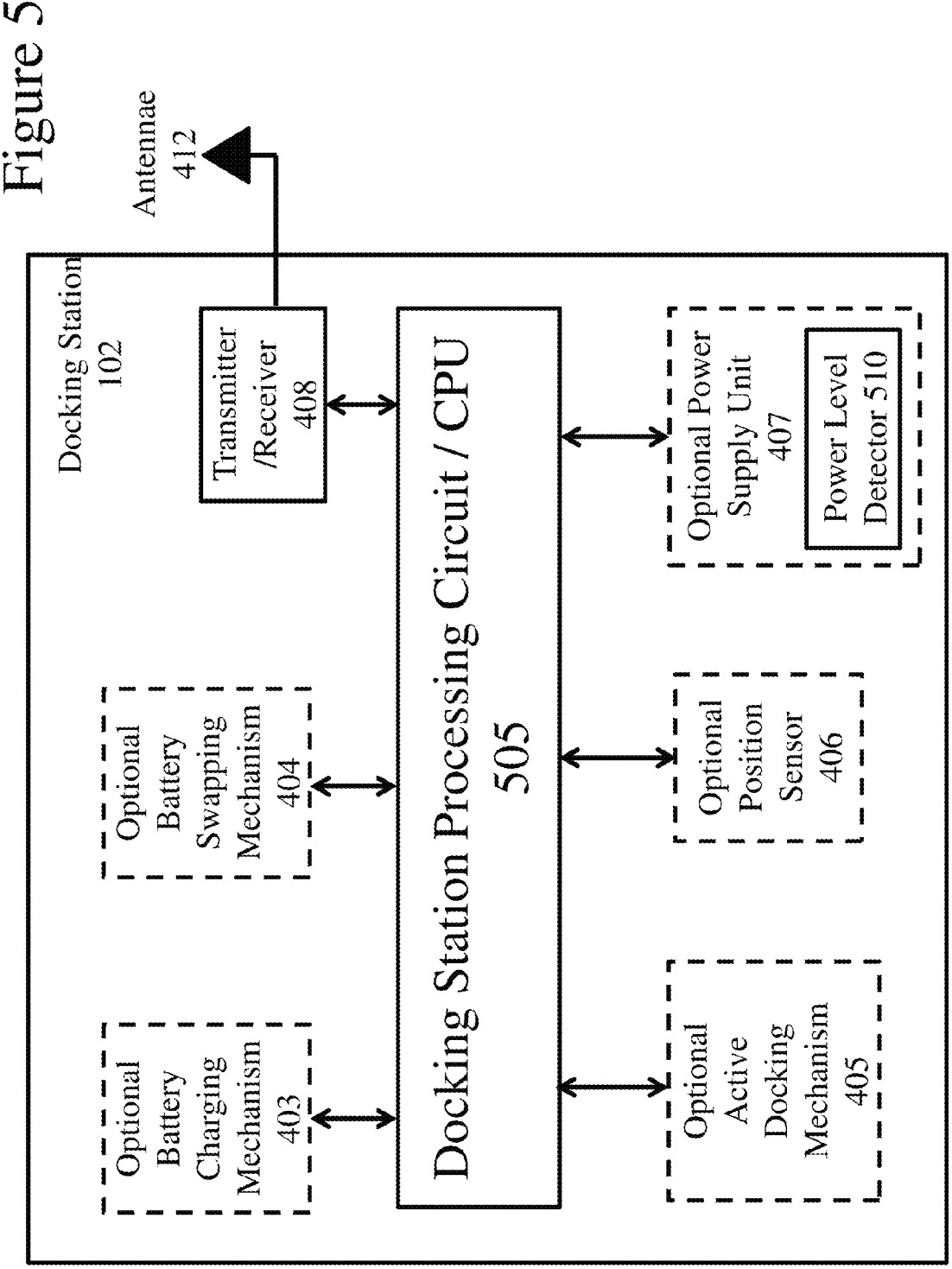
FIG. 5 illustrates a block diagram of a docking station.

FIG. 5 is a block diagram showing the various components of the docking station 102. As shown in FIG. 5, the docking station processing circuit 505 interfaces with the optional battery charging mechanism 403, the optional battery swapping mechanism 404, the transceiver 408, the optional active docking mechanism 405, the optional position sensor 406, and the optional power supply unit 407. The docking station processing circuit 505 receives input data from the various components, processes the input data and generates output data to control and manage the components. The transceiver 408 connects to antennae 412 and communicates with the mission control unit 103 via the antennae 412.

As show in FIG. 5, the optional power supply unit 407 further comprises a power level detector 510. The power level detector 510 monitors the level of the power supply unit 407 and may provide information about the power level of the power supply unit 407 to the docking station processing circuit 505.

Figure 6:
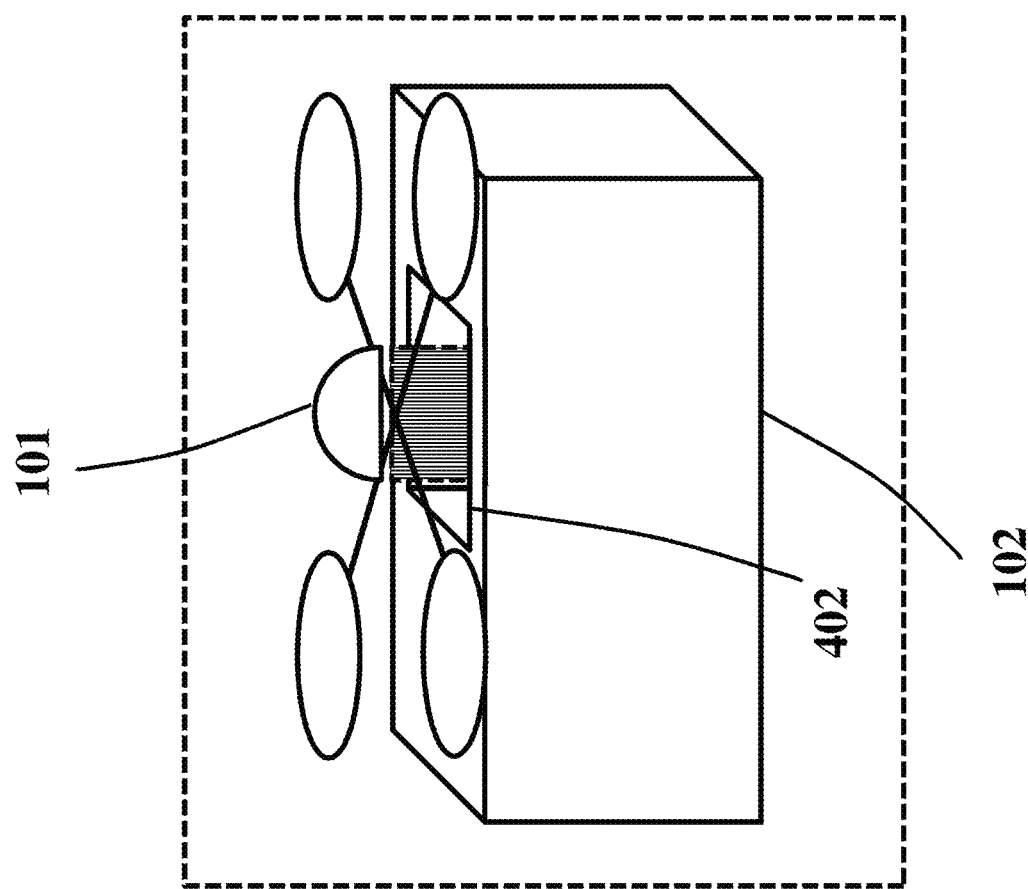
FIG. 6 illustrates an aerial vehicle docked at a docking station.

The docking station 102 shown in FIG. 4 and FIG. 5 is configured to receive and dock the aerial vehicle 101. FIG. 6 depicts an aerial vehicle 101 docked at the docking station 102. The landing zone 402 on the docking station 102 is rectangular and the aerial vehicle 101 is received into the landing zone 402.

Figure 7:
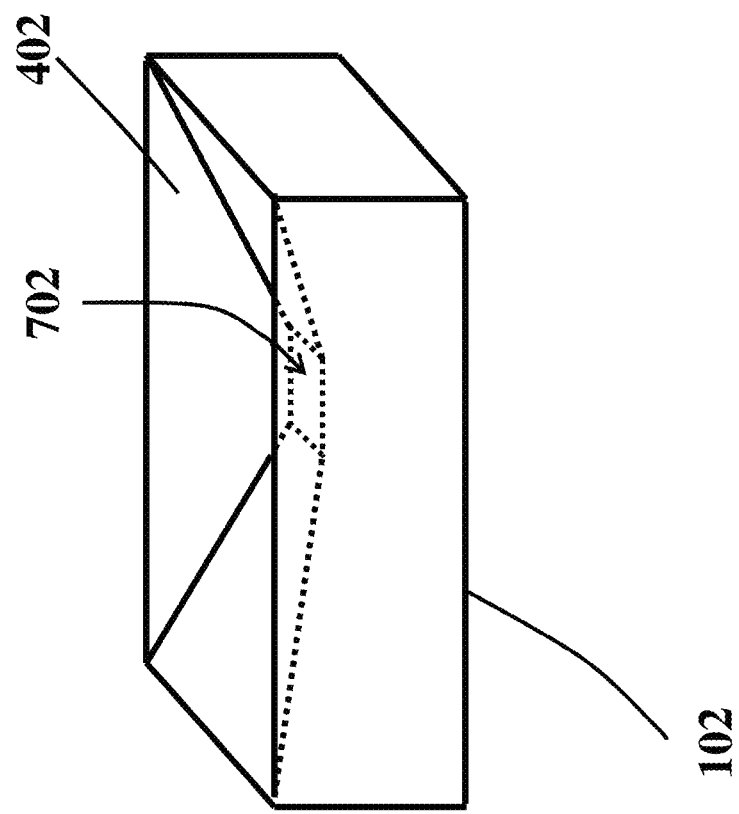

FIGS. 7-10 show different designs of the landing zone 402. In FIG. 7, the landing zone 402 has four slanted surfaces that can direct the aerial vehicle towards the docking surface 702 at the center of the landing zone 402. The landing zone 402 in FIG. 7 has a greater landing surface area than the landing zone 402 in FIG. 6. The design of the landing zone 402 in FIG. 7 enables the aerial vehicle 101 to land and interact with the docking station 102 with greater tolerance.

FIGS. 8a and 8b depict two exemplary docking stations equipped with position sensors 802, 803 interacting with the aerial vehicle 101. In FIG. 8a the aerial vehicle 101 relies on the position sensor 303 to interact with the docking station position sensors 802 to reduce positioning errors. Examples of the position sensors 303, 802 include sound propagation transmitters and emitters. In FIG. 8b, the aerial vehicle 101 is not equipped with a position sensor. The docking station position sensor 803 does not interact with the aerial vehicle 101. Examples of the docking station position sensors 803 include visual cameras and infrared cameras.

Figure 9:
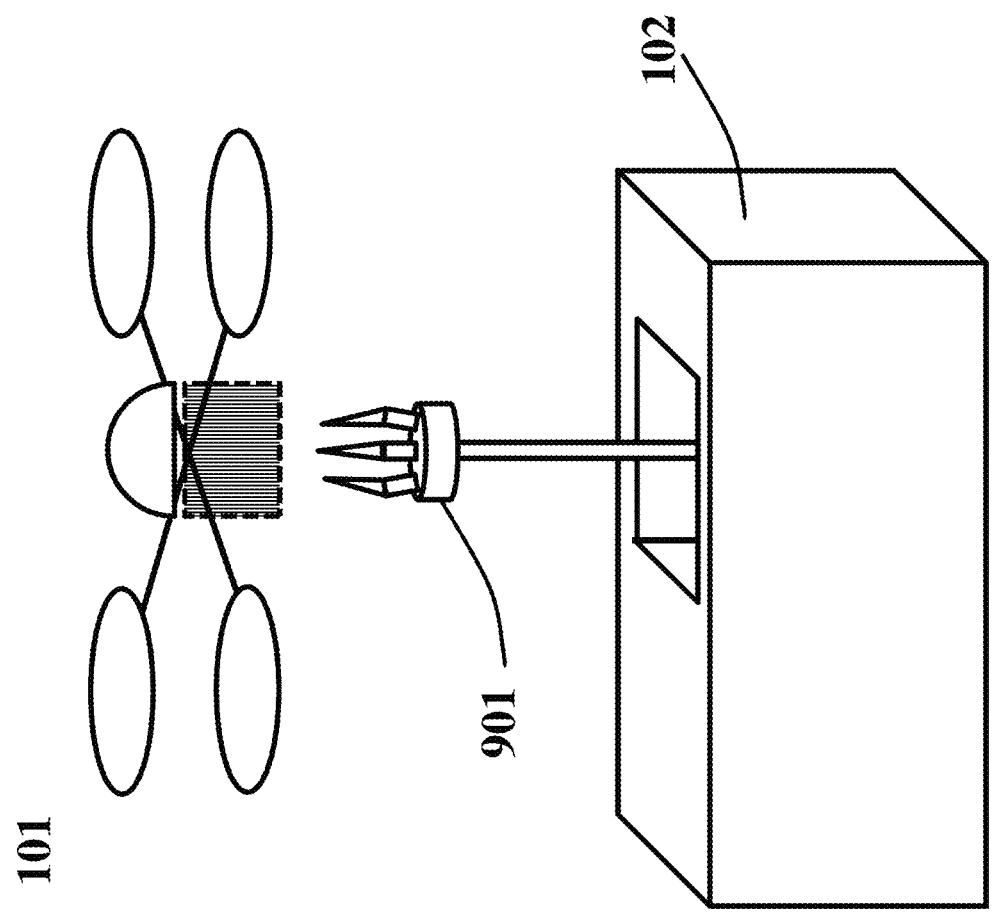

FIG. 9 illustrates another embodiment of the docking station 102. In FIG. 9, the docking station 102 is configured with a landing zone 402 having a rectangular shape and the active docking mechanism 405 (not shown). The active docking mechanism 405 comprises a robotic arm 901 extending from the landing zone 402. The robotic arm 901 can latch onto the aerial vehicle 101 and bring the aerial vehicle 101 into the landing zone 402.

Figure 10:
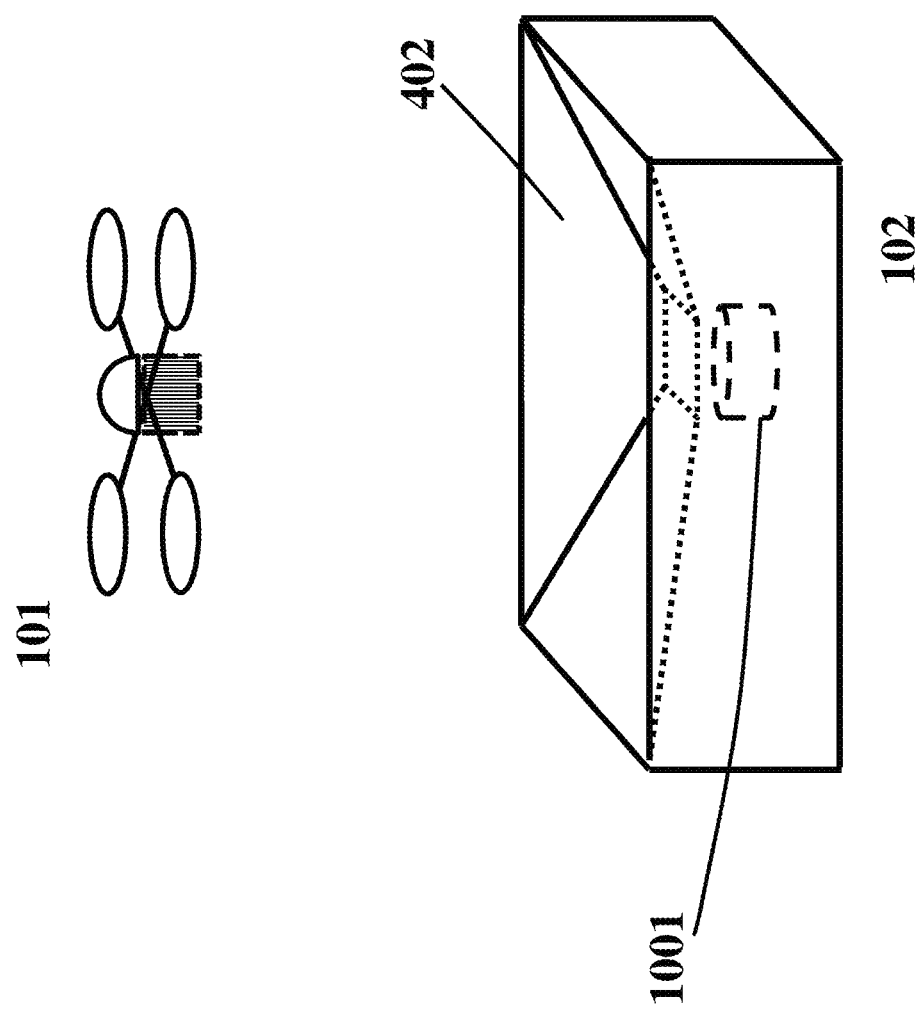

FIG. 10 illustrates another embodiment of the active docking mechanism 405 (shown in dashed line). The active docking mechanism 405 comprises a suction device 1001 that generates a vacuum between the aerial vehicle 101 and the landing zone 402 when the aerial vehicle is parked at the landing zone 402. The air pressure above the aerial vehicle 101 keeps the aerial vehicle 101 firmly docked at the docking station 102. In some embodiments, the suction device 1001 generates a suction force that can draw the aerial vehicle 101 down into the landing zone 402 when the aerial vehicle is within a certain distance from the landing zone 402.

Figure 11:
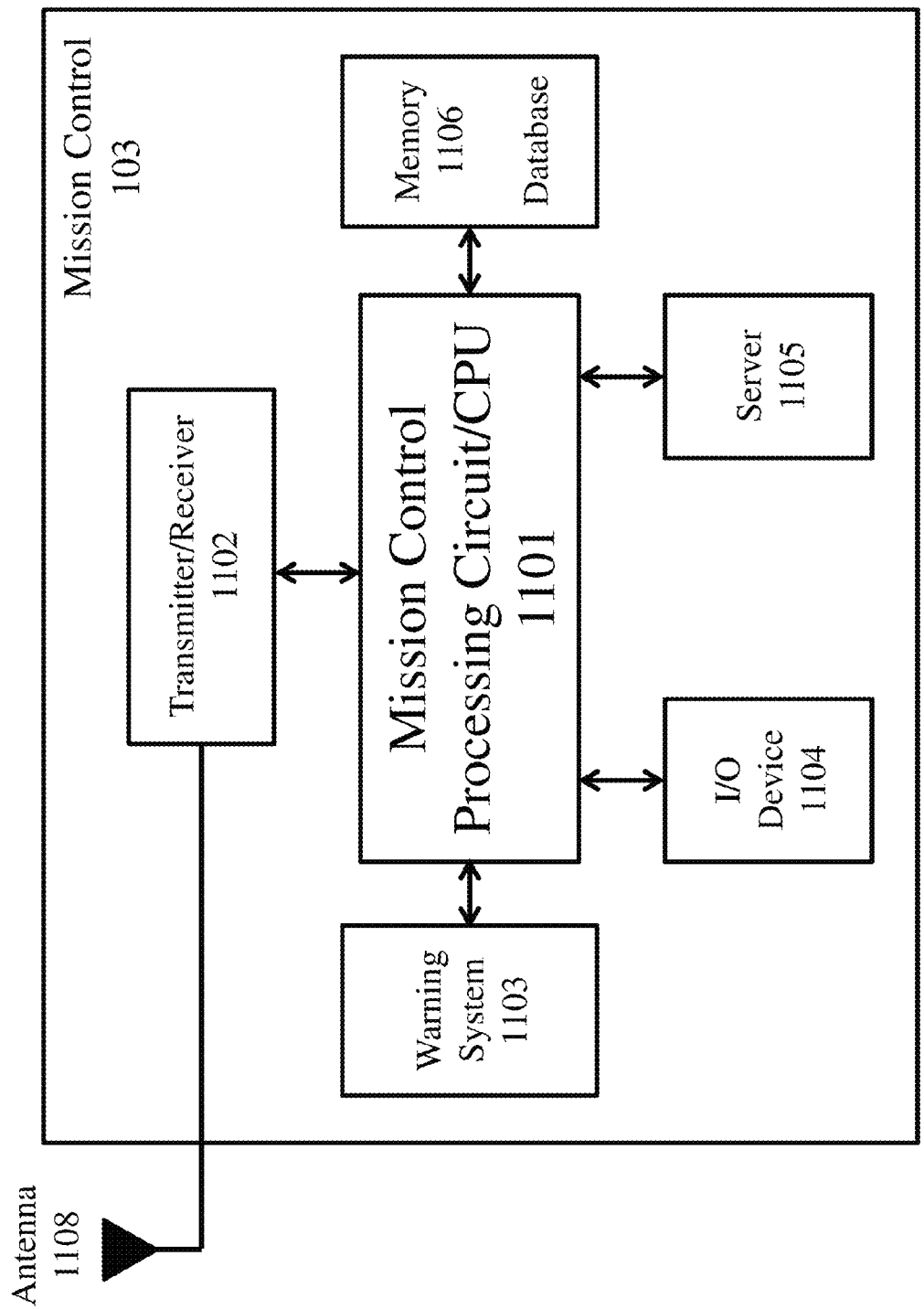
FIG. 11 illustrates an exemplary mission control system.

FIG. 11 shows an exemplary embodiment of the mission control system 103. The mission control system 103 comprises a mission control processing circuit 1101, a transmitter/receiver 1102, a warning system 1103, I/O device(s) 1104, a server 1105, and memory 1106. The mission control processing circuit 1101 receives input data from and outputs data to the other components to control and manage the other components. The transmitter/receiver 1102 is connected to antennae 1108. The mission control system 103 communicates with the aerial vehicle 101 and the docking station 102 via the transmitter/receiver 1102 and the antennae 1108.

Figure 12:
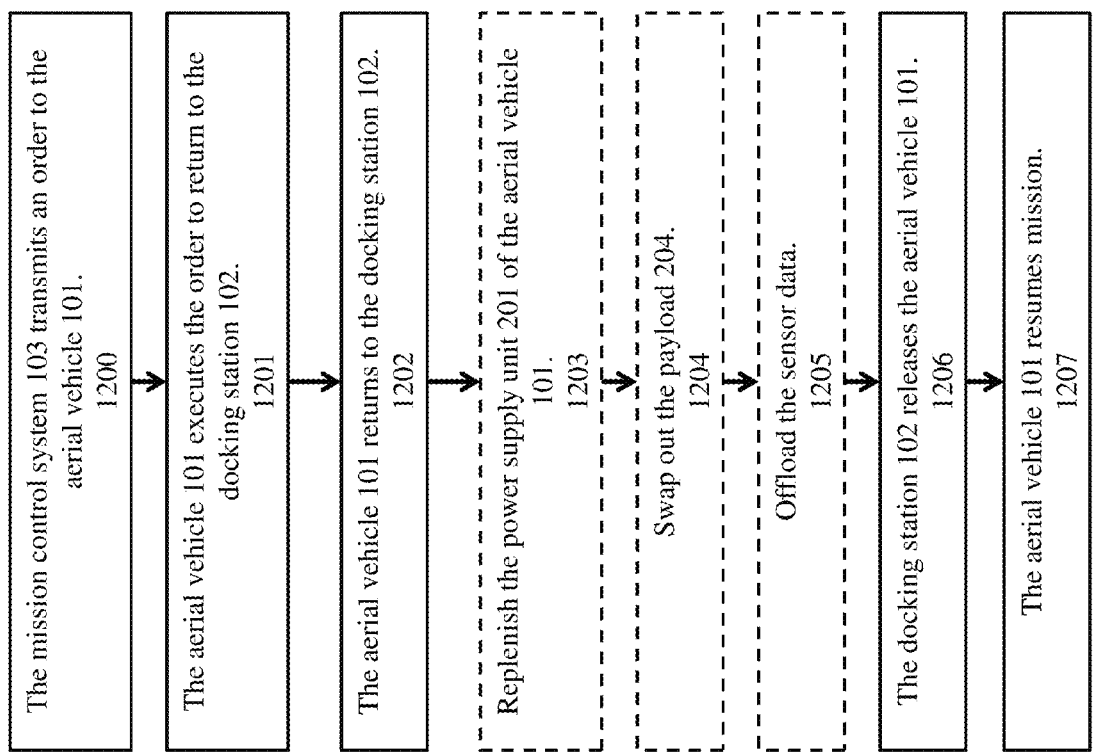
FIG. 12 illustrates a flow chart illustrating a docking procedure of an aerial vehicle.

FIG. 12 is a flow chart illustrating an exemplary docking process controlled by the mission control system 103. The mission control system 103 transmits an order to the aerial vehicle 101 (step 1200). The aerial vehicle 101 executes the order, which directs the aerial vehicle 101 to return to the docking station 102 (step 1201). Then, the aerial vehicle returns to the docking station 102 (step 1202). The docking station 102 can optionally replenish the power supply unit 201 of the aerial vehicle 101 (step 1203), swap out the payload 204 of the aerial vehicle 101 (step 1204), and offload the sensor data collected by the optional sensor 202 and the position sensor 203 (step 1205). When the mission control system determines that the aerial vehicle 101 is to be deployed again, the aerial vehicle 101 is released from the docking station 102 (step 1206). Finally, the aerial vehicle 101 resumes its mission (step 1207).

In some embodiments, the mission control system 103 controls and manages a plurality of aerial vehicles 101. When there is only one docking station 102, the mission control system 103 can arrange the plurality of aerial vehicles 101 to return to the docking station 102 in a pre-determined order.

Figure 13:
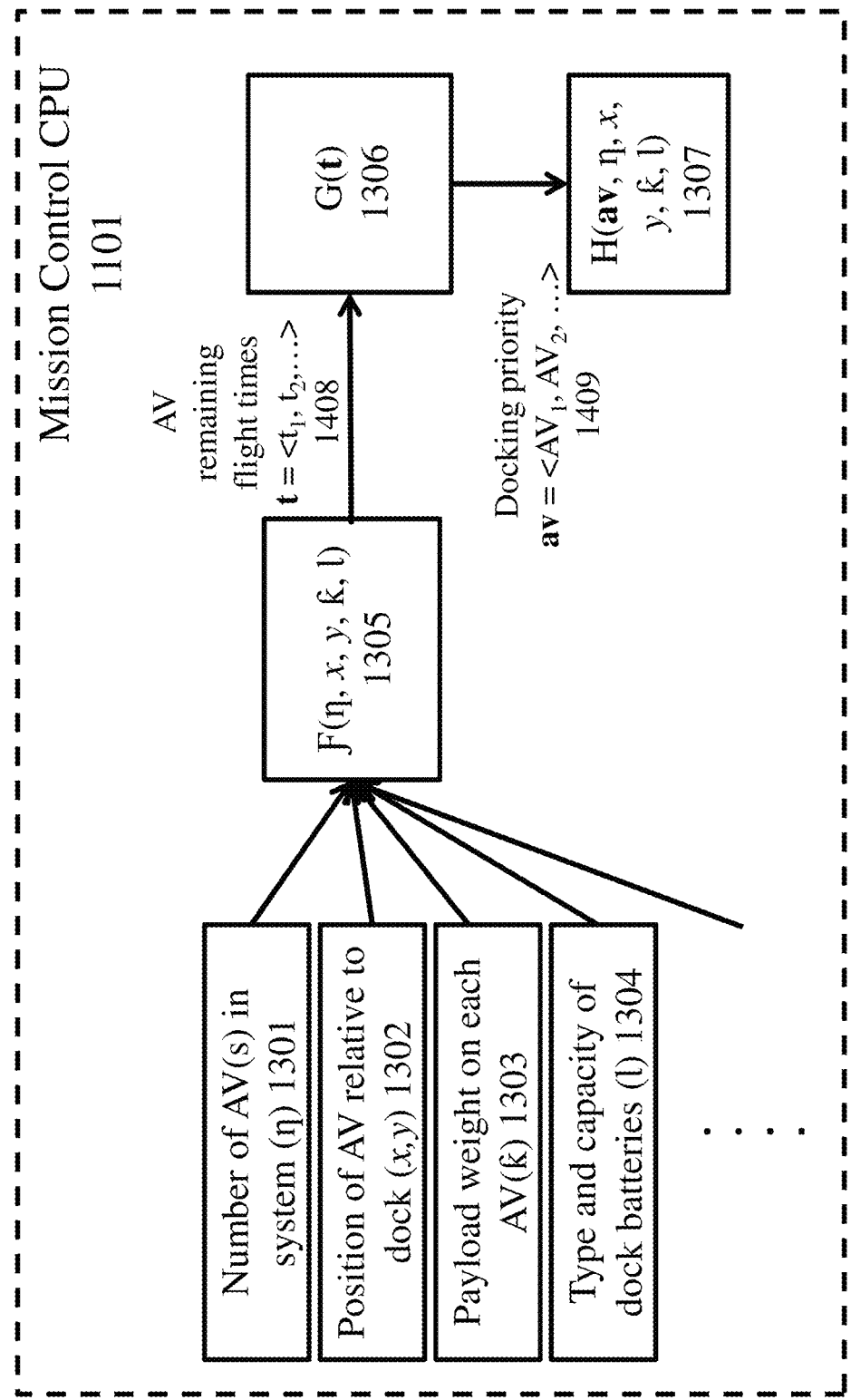
FIG. 13 illustrates an exemplary method for managing multiple aerial vehicles for docking.

FIG. 13 illustrates an exemplary process implemented at the mission control system 103 for generating an ordered list of the aerial vehicles 101. The list is generated according to the priorities assigned to each of the plurality of aerial vehicles 101. The mission control system 103 is configured to receive appropriate flight paths for each of the aerial vehicles 101. Based on the flight path information received from the aerial vehicles, the mission control system generates a set of focal variables. Examples of potential focal variables include, but are not limited to, the number of aerial vehicles in the system 1301, the position of each aerial vehicle relative to the docking station 1302, the payload weight on each aerial vehicle 1303, and the charge status of the docking station power supply unit 1303. These focal variables are inputted into function $F(\eta, x, y, \hat{k}, 1)$ 1305 for calculating the remaining flight time of each aerial vehicle. This vector of remaining flight times $t=<t1, t2, \ldots> $ 1308 is inputted into function G(t) to create an ordinal list of docking priorities expressed as a vector $av=<AV1, AV2, \ldots>$ 1309. This ordinal list is processed to calculate the optimal flight paths for the set of aerial vehicles. In another embodiment, the flight path may be calculated locally on each of the aerial vehicles, not on the mission control system 103.

Figure 14:
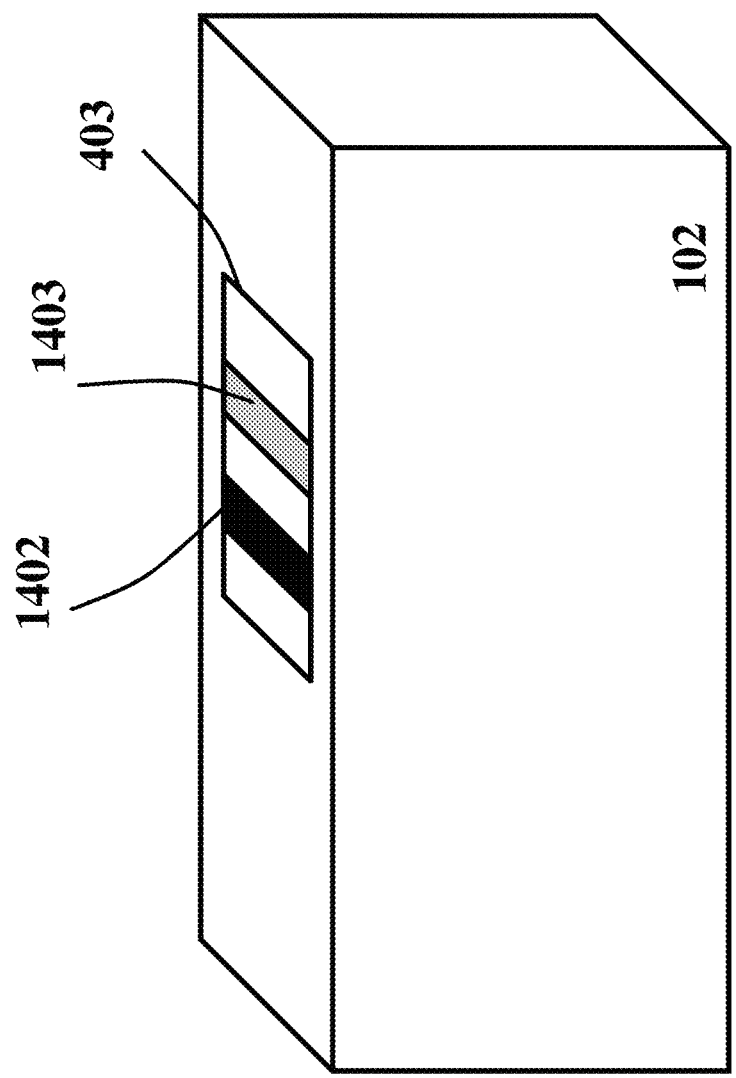

FIG. 14 illustrates an embodiment of the battery charging mechanism 403 of the docking station 102. The battery charging mechanism 403 comprises a positive lead 1403 and a negative lead 1402. The aerial vehicle 101 lands on the landing zone 402. The power supply unit 201 of the aerial vehicle 101 is charged by interfacing with the positive lead 1403 and the negative lead 1402 of the battery charging mechanism 403.

Figure 15:
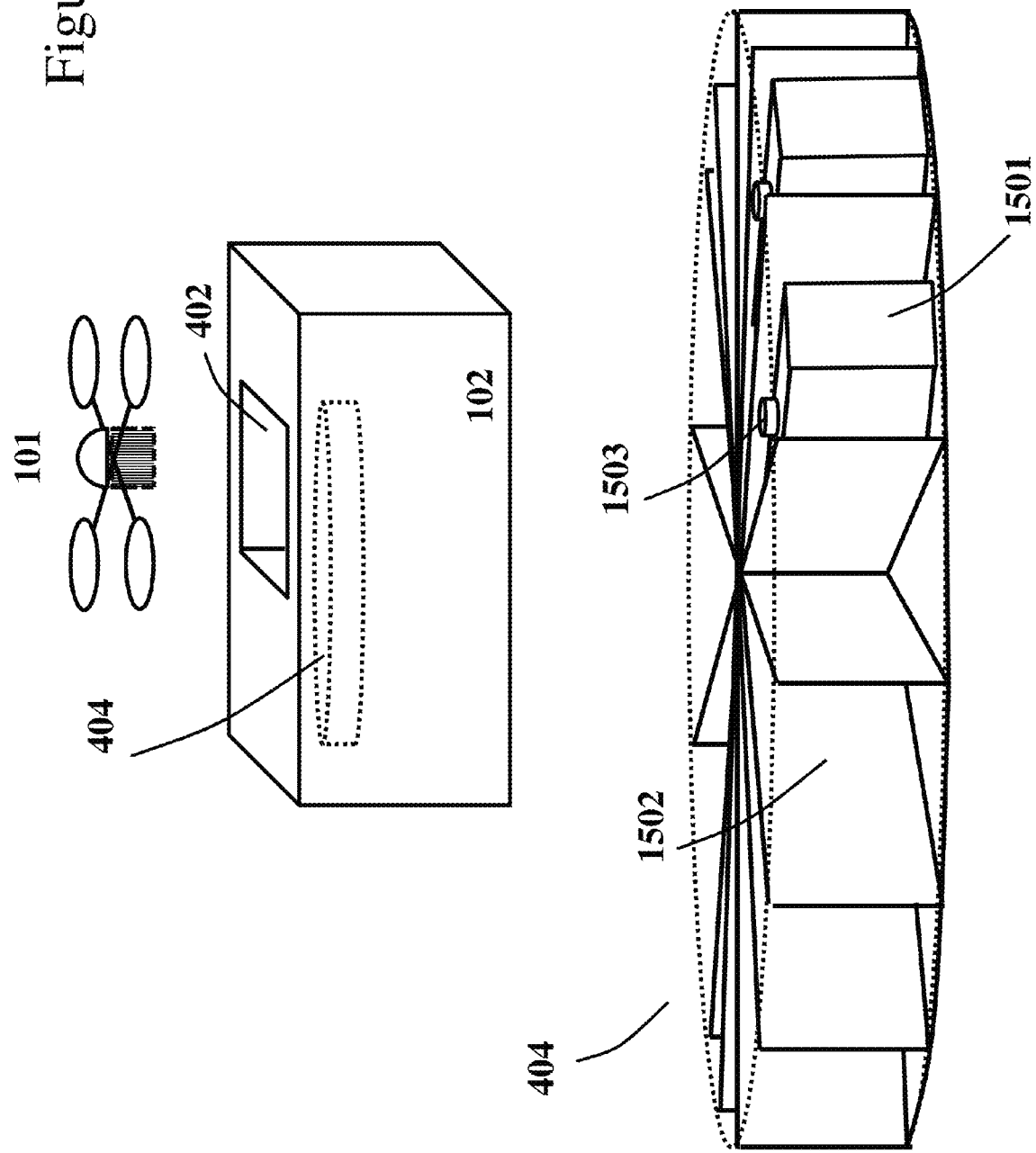
Figure 17:
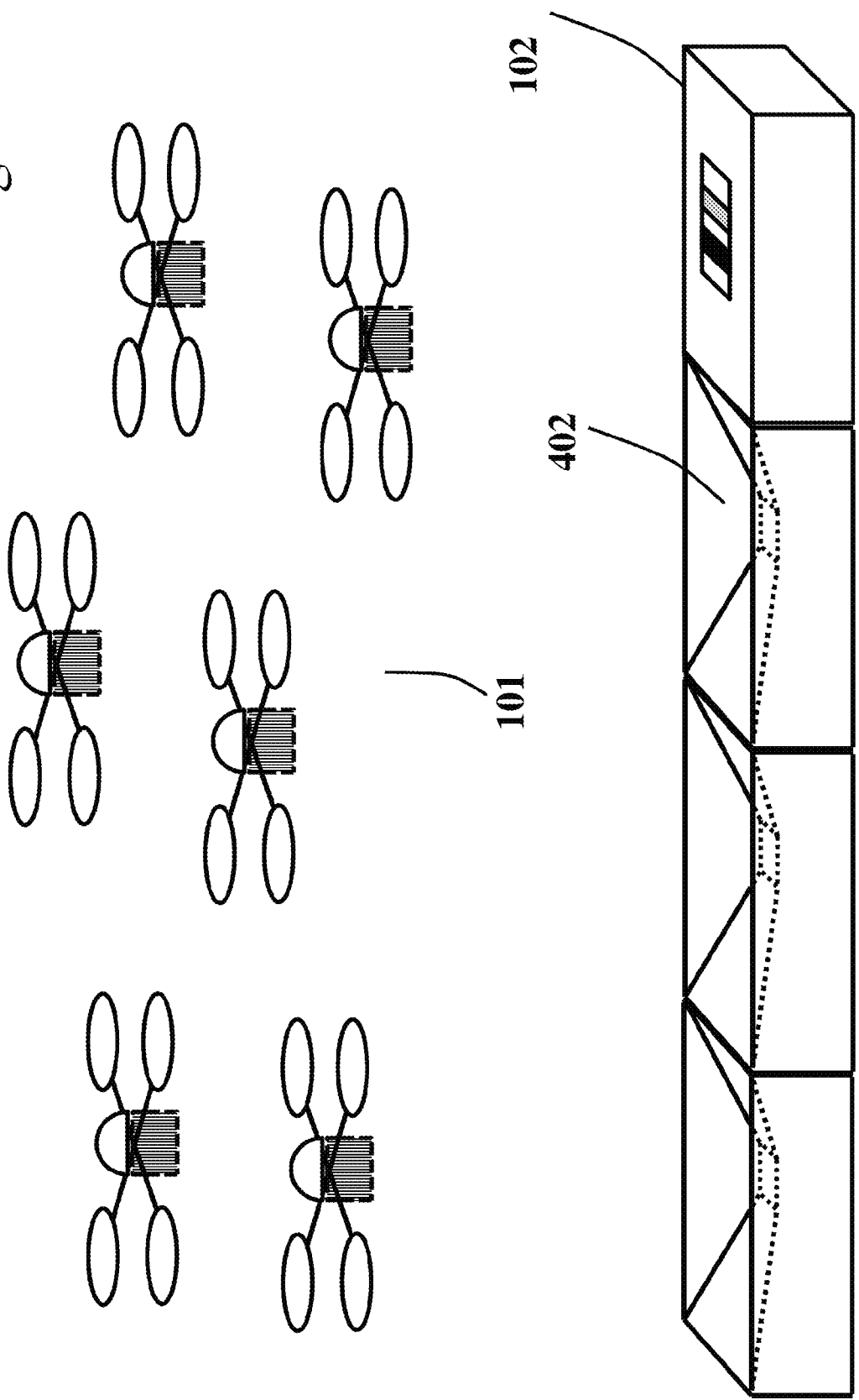

FIGS. 15-17 illustrate different embodiments of the battery swapping mechanism 404 on the docking station 102. In FIG. 15, the aerial vehicle 101 lands and docks into the landing zone 402 of the docking station 102. The battery swap mechanism 404 comprises multiple slots 1502. Each slot may contain a charged, charging, or uncharged battery 1501. One or more of the multiple slots may be empty. When the aerial vehicle 101 lands on the docking station 102, one of the empty slots in the battery swapping mechanism 404 accepts the depleted battery of the aerial vehicle 101. The battery swapping mechanism 404 revolves until a slot containing a charged battery is aligned with the aerial vehicle 101. The charged battery is then pushed up by the battery swapping mechanism 404 into the power supply unit 201 of the aerial vehicle 101. A latching mechanism 1503 located on the battery can be used to latch the battery onto the aerial vehicle 101.

FIG. 16 shows a detailed illustration of the battery swapping mechanism 404 used to store and charge batteries, and swap batteries with the aerial vehicle 101. The battery wheel 1601 holds and stores a number of battery or battery packs 1614. The servo and lift mechanism 1612 is responsible for removing the depleted battery pack from the aerial vehicle 101, aligning a charged battery pack under the aerial vehicle 101, and latching the battery pack onto the aerial vehicle 101. To swap a battery after the aerial vehicle 101 has docked onto the dock station 102, the servo and lift mechanism 1612 aligns an empty slot under the depleted battery pack, unclips the depleted battery pack from the body of the aerial vehicle 101, aligns a charged battery under the body of the vehicle 101, lifts up the charged battery, and clips the battery in place.

FIG. 17 illustrates an embodiment of the docking station 102 in which multiple aerial vehicles are paired with multiple docking zones 402. In some embodiments the number of aerial vehicles 101 and the number of docking zones 402 are different. In some embodiments, different types of dock zones 402 can be incorporated into the docking station 102.

Figure 18:
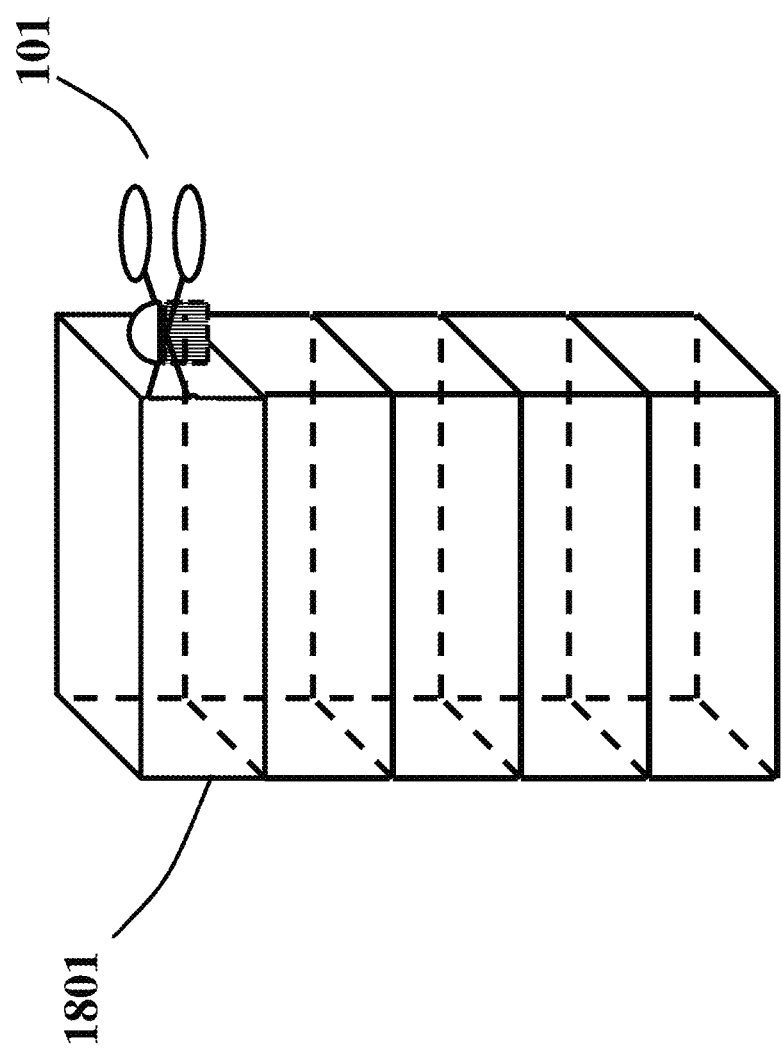

FIG. 18 illustrates an embodiment of the docking station 102 in which multiple docking stations 102 are stacked up vertically to save space. The stack of docking stations 1801 can allow for multiple aerial vehicles 101 to be stored. In some embodiments, each docking station 102 may be equipped with a cover for storing the aerial vehicle 101.

Figure 19:
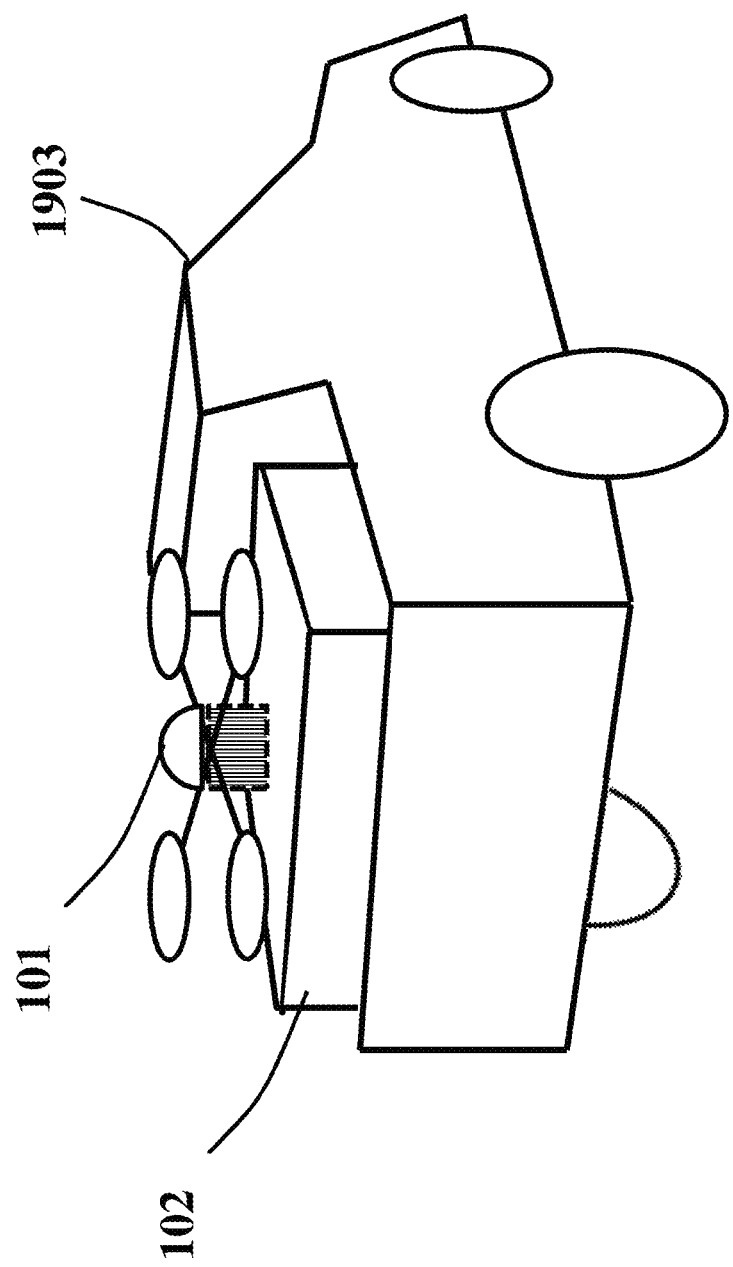
FIG. 19 illustrates an embodiment of an aerial vehicle deployment system.

FIG. 19 illustrates an embodiment of the docking station 102 installed on a moving vehicle 1903. The moving vehicle is depicted here as a pickup truck, but can also be a boat, a motorcycle, or another aerial vehicle 101. In FIG. 19, the aerial vehicle 101 is carried over a long distance when not in use and may be deployed to carry out missions in the vicinity of the moving vehicle 1903. The docking station 102 can also be transported to distant locations to service aerial vehicles.

The present invention may be carried out in other specific ways than those herein set forth without departing from the scope and essential characteristics of the invention. One or more of the specific processes discussed above may be carried out in devices configured with processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A system for persistent deployment of aerial vehicles to and from a docking station, the system comprising:
aerial vehicles configured to:
perform a mission when deployed; and
return to a docking station for docking;
the docking station configured to:
receive the aerial vehicles; and
supply power to the aerial vehicles; and
a mission control system for controlling and managing the aerial vehicles by arranging the aerial vehicles that are deployed from the docking station to return to the docking station in a predetermined order based on a total number of the aerial vehicles that are deployed from the docking station, a position of each of the aerial vehicles relative to the docking station, and a payload weight of each of the aerial vehicles.

2. The system of claim 1, wherein the docking station is further configured to upload and/or download data to and from the aerial vehicles.

3. The system of claim 2, wherein the docking station comprises a battery swapping device for removing a depleted battery from an aerial vehicle and refilling a charged battery into the aerial vehicle.

4. The system of claim 1, wherein the mission control system is configured to assign priorities to each of the aerial vehicles.

5. The system of claim 1, further comprising the mission control system controlling and managing the aerial vehicles according to a charge status of a power supply at the docking station.

6. The system of claim 1, further comprising the mission control system calculating a remaining flight time for each of the aerial vehicles that are deployed from the docking station.

* * * * *